March 26, 1946. H. D. JOHNSON, JR 2,397,319
AIRPLANE WHEEL SPINNER
Filed Oct. 30, 1944 3 Sheets-Sheet 1

H. D. Johnson, Jr.
Inventor

By Bryant & Lowry
Attorneys

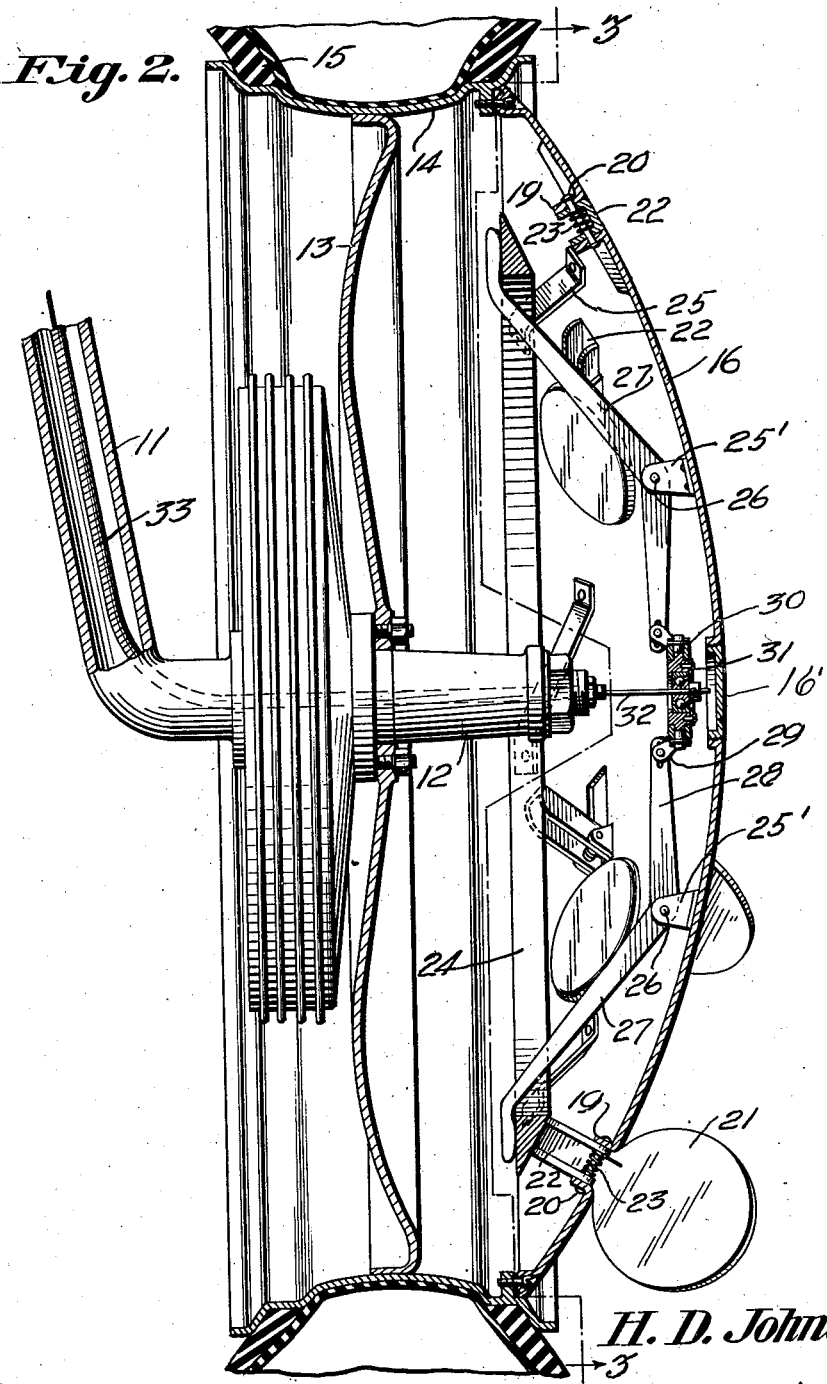

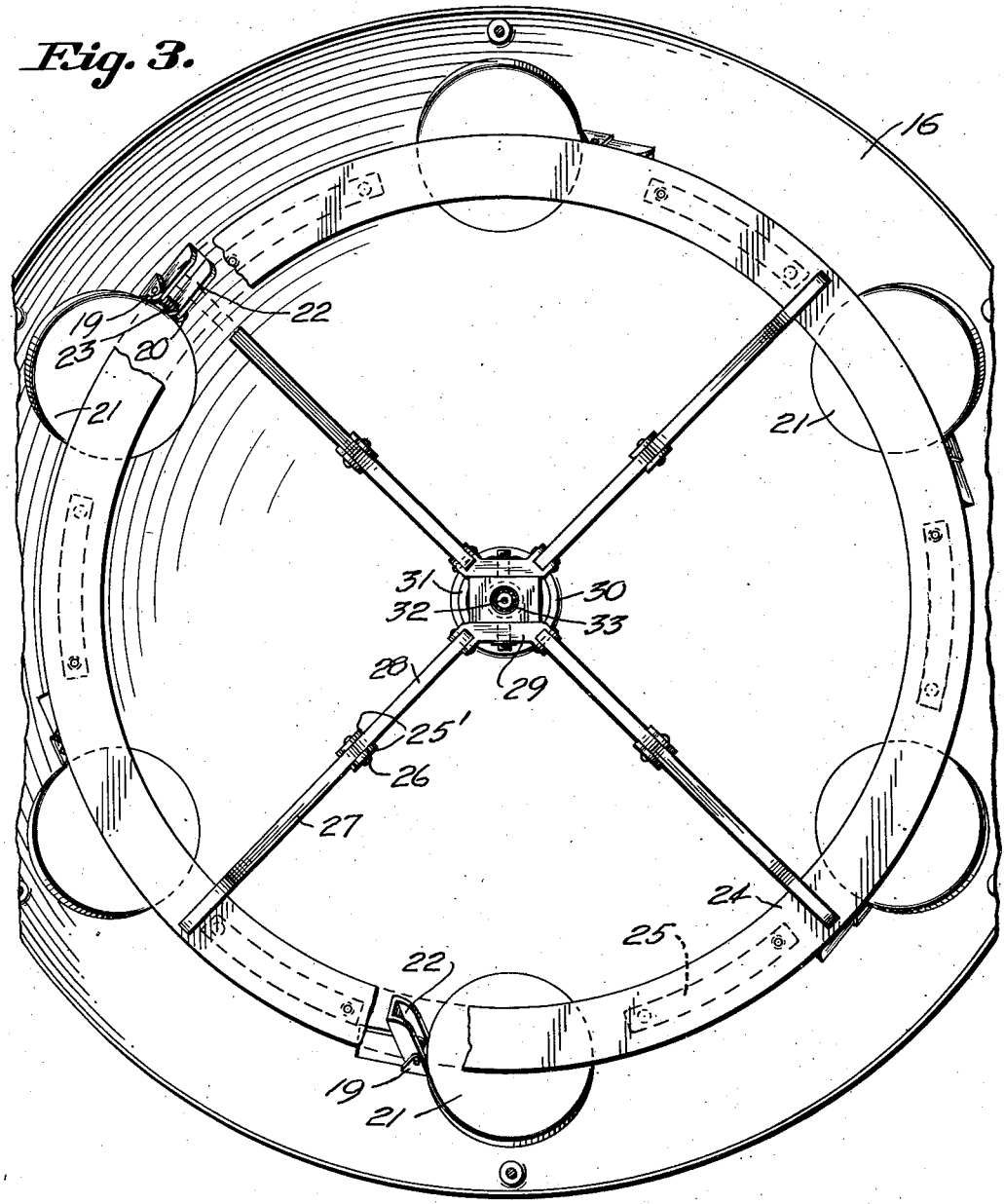

Patented Mar. 26, 1946

2,397,319

UNITED STATES PATENT OFFICE 2,397,319

AIRPLANE WHEEL SPINNER

Hubert D. Johnson, Jr., Wilton, Calif.

Application October 30, 1944, Serial No. 561,031

4 Claims. (Cl. 244—103)

This invention relates to aircraft and has special reference to landing wheels for aircraft.

When an airship of any class and especially an airplane lands the landing wheels are in a state of rest. These wheels have very considerable weight especially in the heavier types of aircraft and when they strike the ground they are subject to very great torque since they are almost instantaneously started in revolution with a peripheral speed equal to the speed of the aircraft over the ground. It is advisable that such landing wheels be started in rotation prior to contact with the ground and the principal object of this invention is to provide means controllable by an operator of the aircraft which will effect rotation of the landing wheels at a suitable time prior to their ground contact, such rotation giving the wheels substantially a peripheral speed equal to that which will be assumed by the wheels upon contact with the ground.

A second important object of the invention is to provide a means for the above purpose the operation of which is effected by the speed of the aircraft through the air.

With the above and other objects in view as will be hereinafter apparent the invention consists in general of certain novel details of construction and combinations of parts hereinafter fully described, illustrated in the accompanying drawings, and particularly claimed.

In the accompanying drawings, like characters of reference indicate like parts in the several views, and:

Figure 2 is an enlarged cross-section through such a wheel.

Figure 3 is a section on the line 3—3 of Figure 2.

Figure 1:
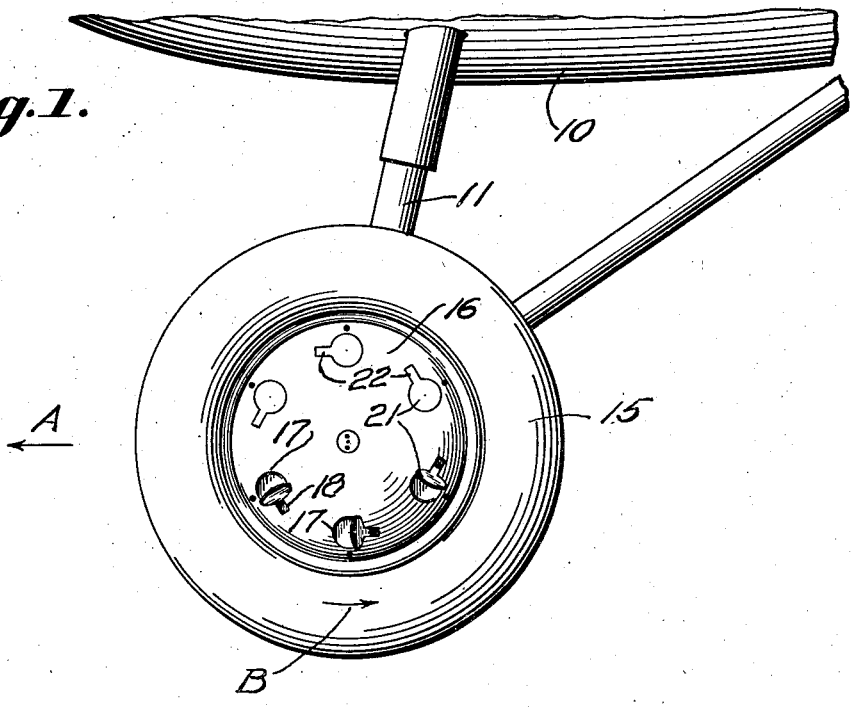
Figure 1 is a side elevation of a portion of an airplane showing one of the landing wheels.

In the form of the invention as here disclosed, there is shown a portion 10 of an aircraft body having the usual wheel support 11 terminating in a hollow axle 12. On this axle is mounted the usual wheel 13 having a rim 14 which carries a tire 15. The wheel is provided with the usual hub cap 16 and this hub cap is shaped to form a series of pocket recesses 17 which are spaced around a circle concentric to the center of the hub cap. With each of these pockets there is associated an opening 18 leading to the interior of the hub cap. At the junction of each opening with the corresponding recess 17, is a pair of ears 19 carrying a pin 20 whereon is mounted a wind vane 21 so shaped as to normally fit the recess 17 and provide the completion of a streamlined surface on the outer face of the hub cap. Each of these wind vanes has a finger 22 which in one position of the vane closes the opening 18 while in another position of the vane it projects inwardly of the hub cap as shown most clearly in Figure 4. Surrounding the pin 20 is a coiled spring 23 which constantly urges the vane 21 to swing outwardly of the hub cap. However, this spring is so graduated in strength that an air blast acting on the outer face of the vane 21 will cause the vane to swing inward at the seat in the recess 17.

As shown in Figure 1, the motion of the aircraft is in the direction of the arrow A. Now it will be observed from that figure that the three lower vanes have been swung outwardly by the influence of the springs 23 so that the air striking these vanes as the aircraft moves will cause rotation of the wheel in the direction of the arrow B.

By this means the flight of the aircraft through the air will start the ground wheels in motion and the starting will not be abrupt because of the air through which the wheel passes being, of course, of yielding nature but as the wheel continues to move through the air the speed increases until the peripheral speed of the wheel equals that of the movement of the ariplane as a whole through the air. Thus when the landing wheels strike the ground they are rotating with a peripheral speed substantially equivalent to the speed of the airplane while moving over such ground.

In order to prevent the wind vanes from opening during the ordinary flight of the aircraft there is provided within the hub cap a ring 24 which is connected to the cap by a series of leaf springs 25. The fingers 22 bear against this ring and the ring is movable between the position shown in full lines in Figure 4 and that shown in broken lines in said figure. When in full lines it will be noticed that the vane 21 is open while in the broken line position the vane 21 will seat in the recess 17. In order to actuate this ring between its extreme positions there is mounted on the inner face of the hub cap a series of ears 25' carrying pivot pins 26 which pass through levers having outer radial arms 27 and inner radial arms 28. These outer radial arms engage at their ends behind ring 24. The arms 28 are connected by equalizer links 29 to the outer race 30 of a thrust bearing having an inner race 31. This inner race has the end 32 of a Bowden wire arrangement 33 which passes through the hollow hub and axle 12. Inspection of and access to the Bowden wire arrangement is facilitated by the removable disk 16' in the hub cap 16.

Figure 4:
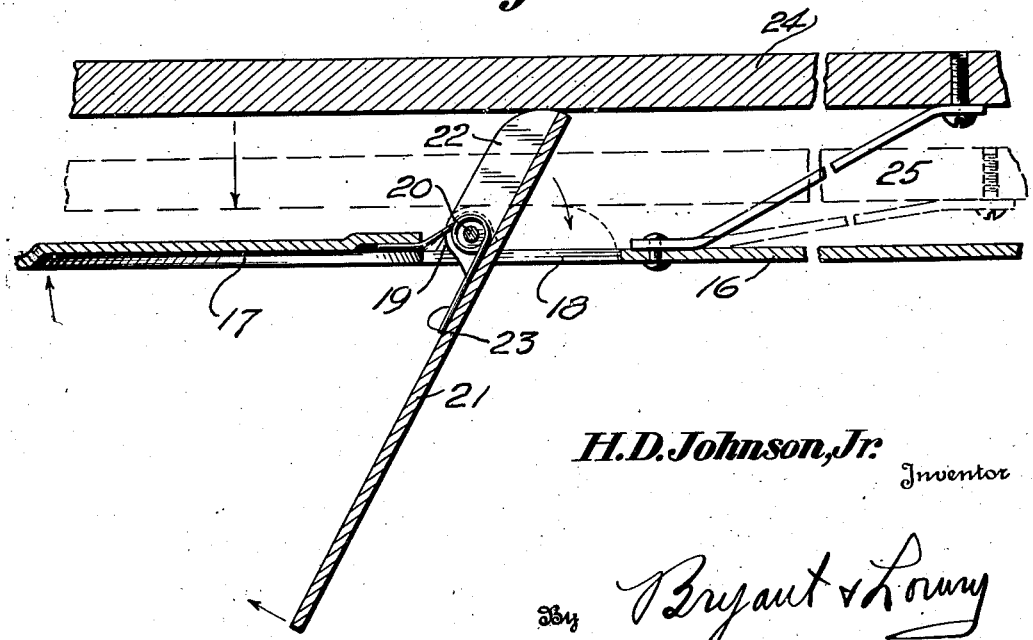
Figure 4 is a detailed section of a portion of the wheel showing the arrangement of one of the air vanes used in connection with this invention.

The Bowden wire leads to any convenient position near the pilot's seat and formally is under tension so that the lever arms 28 are swung inwardly toward the hub while the arms 27 are swung outwardly and carry with them the ring 24, thus holding it in the broken line position shown in Figure 4 and consequently keeping the wind vanes in their recesses or pockets 17.

On approaching a landing the pilot or other operator relaxes the tension on the Bowden wire with the consequence that the springs 25 force the ring 24 into the full line position shown in Figure 4 and this permits the springs 23 to effect opening of the wind vanes as before described.

While there is herein shown and described the preferred embodiment of the invention, it is nevertheless to be understood that minor changes may be made therein without departing from the spirit and scope of the invention as claimed.

What is claimed is:

1. In an airplane wheel, a hub cap having pockets extending inwardly from its outer surface and having openings at corresponding ends of said pockets, said pockets and openings surrounding the center of the hub cap in a concentric series, wind vanes normally filling said pockets and each having a tongue portion extending through the respective opening inwardly of the hub cap, said wind vanes being pivoted to said hub cap at the junctions of said tongues, springs urging said vanes into outwardly biased positions on their pivots, and releasable manually operable means engaging said tongues and holding said vanes in said pockets.

2. In an airplane wheel, a hub cap having pockets extending inwardly from its outer surface and having openings at corresponding ends of said pockets, said pockets and openings surrounding the center of the hub cap in a concentric series, wind vanes normally filling said pockets and each having a tongue portion extending through the respective opening inwardly of the hub cap, said wind vanes being pivoted to said hub cap at the junctions of said tongues, springs urging said vanes into outwardly biased positions on their pivots, a ring in said hub cap against which said tongues rest, spring means urging said ring inwardly of said hub cap, and manually operable means for urging said ring outwardly against its spring means.

3. In an airplane wheel, a hub cap having pockets extending inwardly from its outer surface and having openings at corresponding ends of said pockets, said pockets and openings surrounding the center of the hub cap in a concentric series, wind vanes normally filling said pockets and each having a tongue portion extending through the respective opening inwardly of the hub cap, said wind vanes being pivoted to said hub cap at the junctions of said tongues, springs urging said vanes into outwardly biased positions on their pivots, a ring in said hub cap against which said tongues rest, spring means urging said ring inwardly of said hub cap, levers pivoted within said hub cap and having radially extending arms engaging behind said ring and other arms extending toward the center of said hub cap, and manually operable means for moving said last arms inwardly of said hub cap.

4. In an airplane wheel, a hub cap having pockets extending inwardly from its outer surface and having openings at corresponding ends of said pockets, said pockets and openings surrounding the center of the hub cap in a concentric series, wind vanes normally filling said pockets and each having a tongue portion extending through the respective opening inwardly of the hub cap, said wind vanes being pivoted to said hub cap at the junctions of said tongues, springs urging said vanes into outwardly biased positions on their pivots, a ring in said hub cap against which said tongues rest, spring means urging said ring inwardly of said hub cap, levers pivoted within said hub cap and having radially extending arms engaging behind said ring and other arms extending toward the center of said hub cap, a thrust bearing having an inner race and having an outer race linked to the last mentioned arms, and a Bowden wire connected to said inner race, said wheel having an axle through which said wire passes.

HUBERT D. JOHNSON, Jr.